July 8, 1924.
O. F. CARLSON
MOTOR VEHICLE
Filed Oct. 11, 1919   15 Sheets-Sheet 10
1,500,801
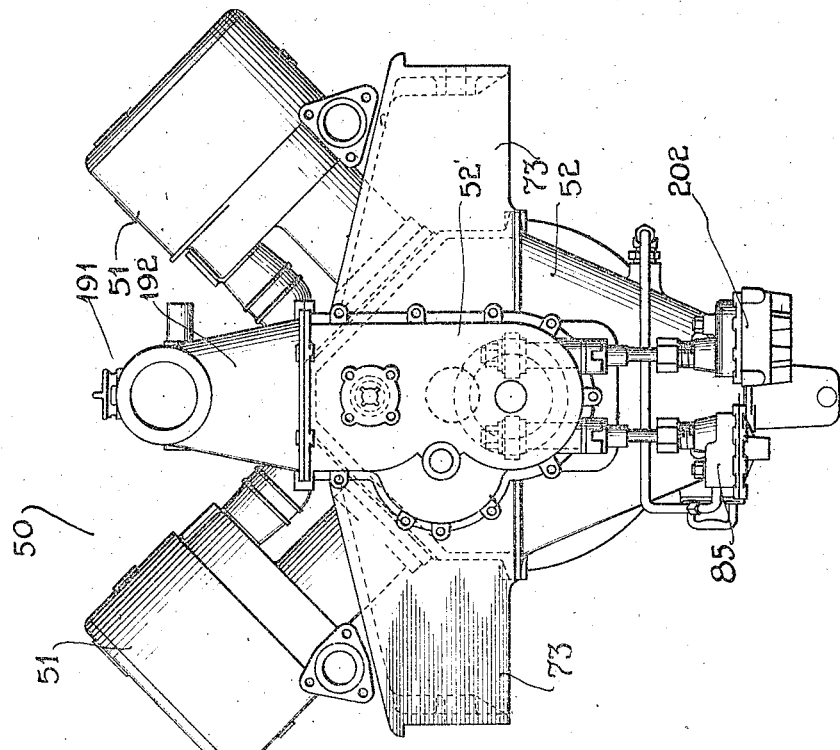
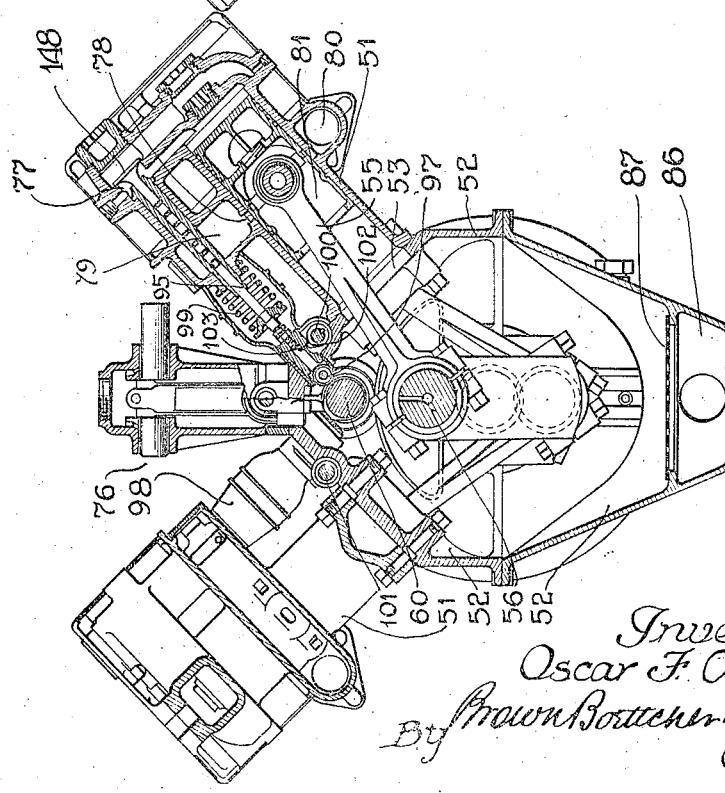
Inventor
Oscar F. Carlson
By Brown Boettcher & Dienner
Att'ys.

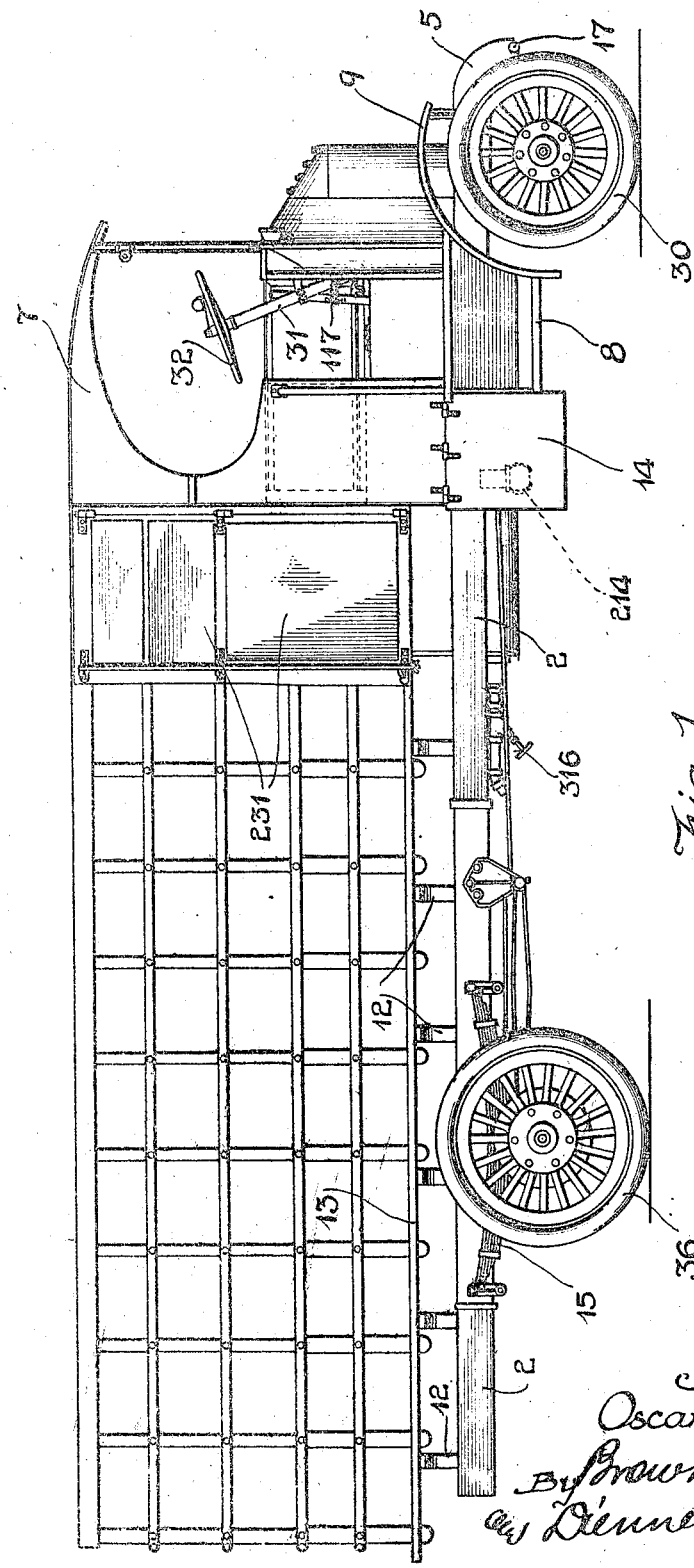

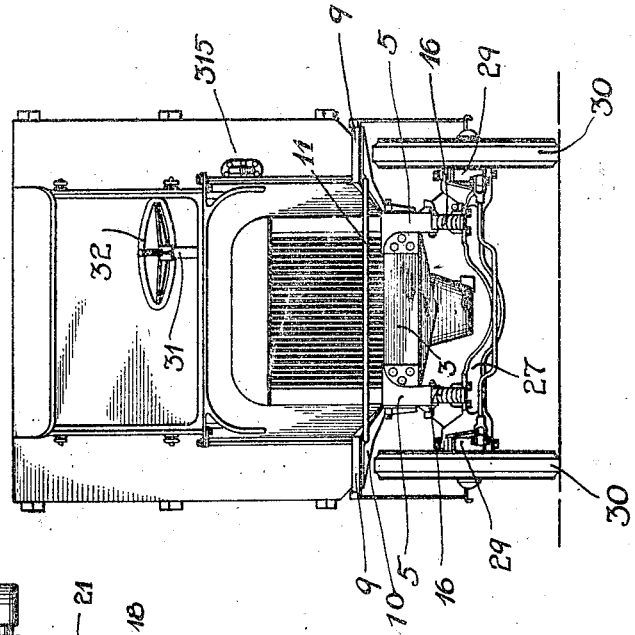
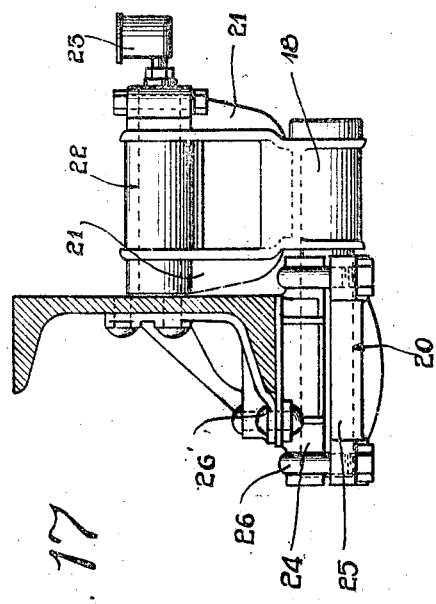
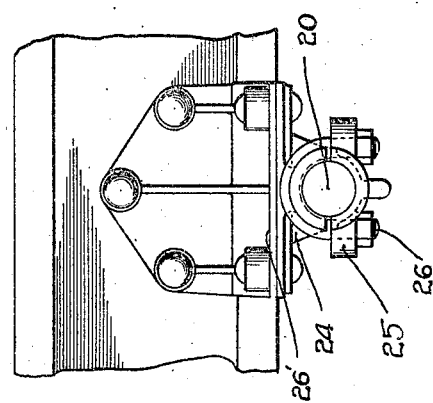

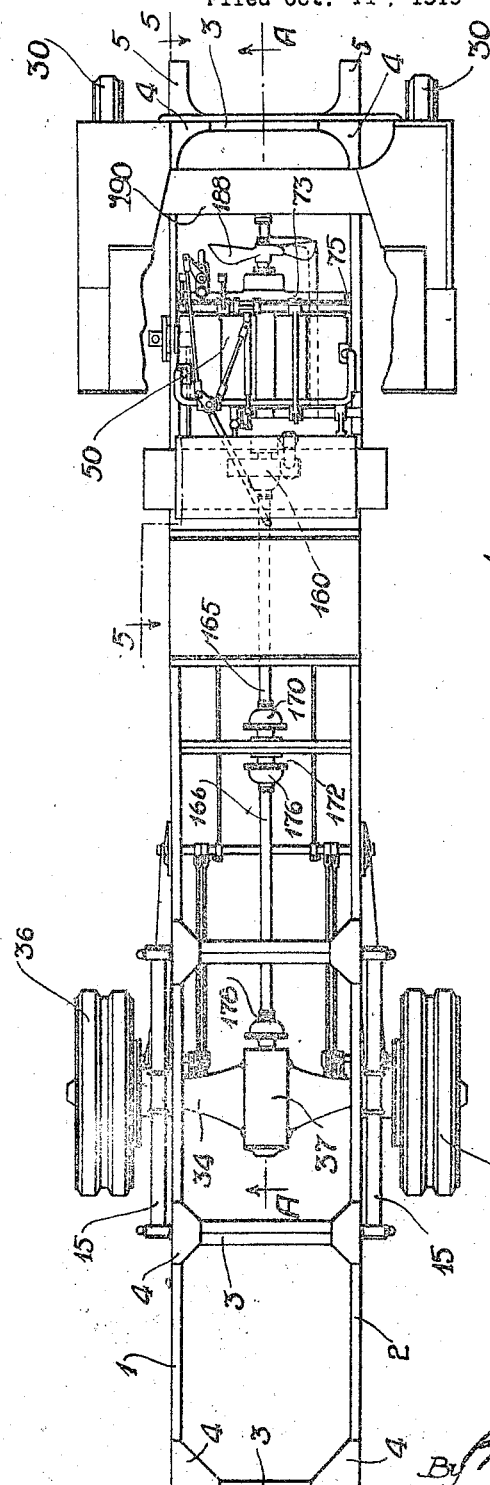

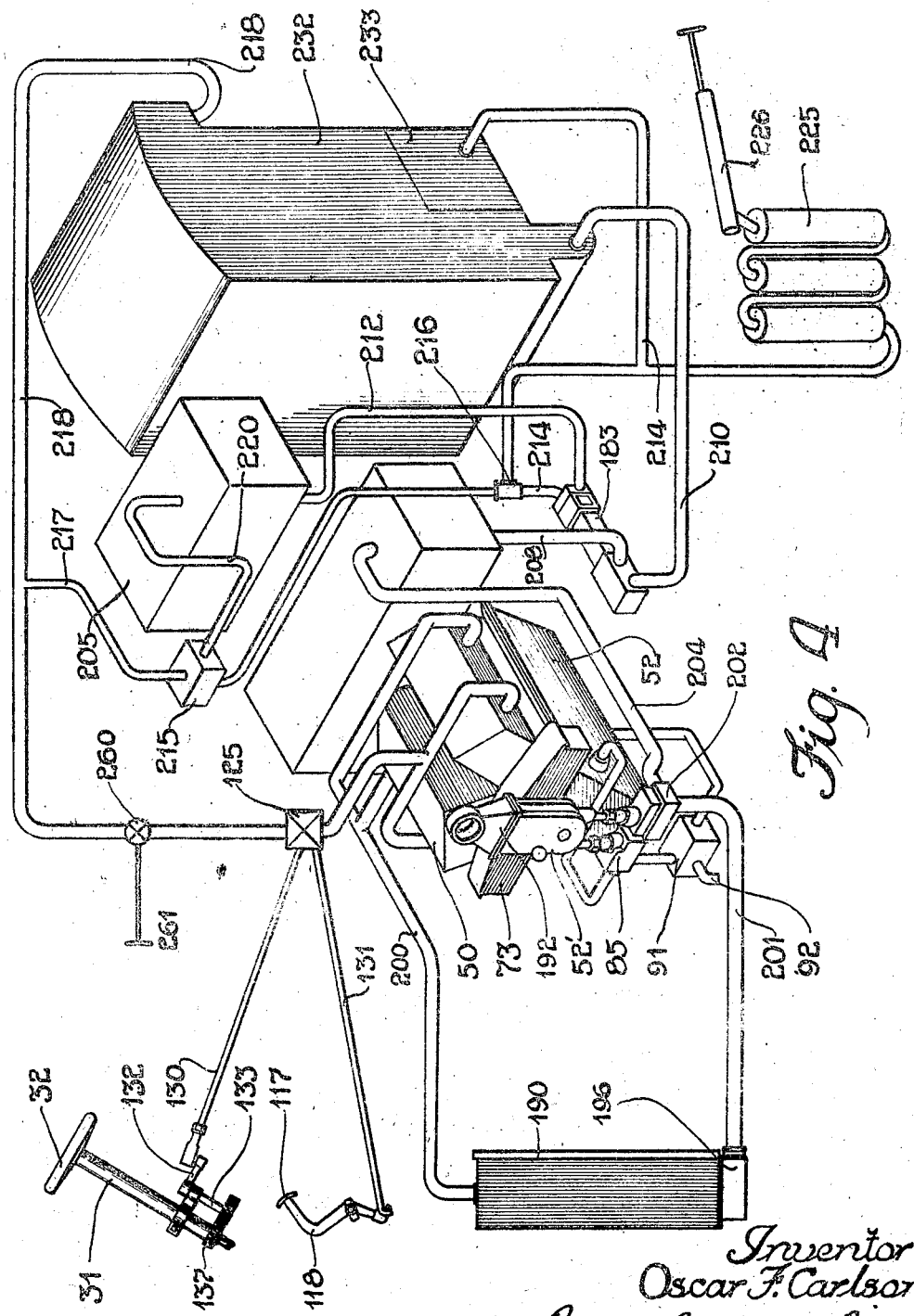

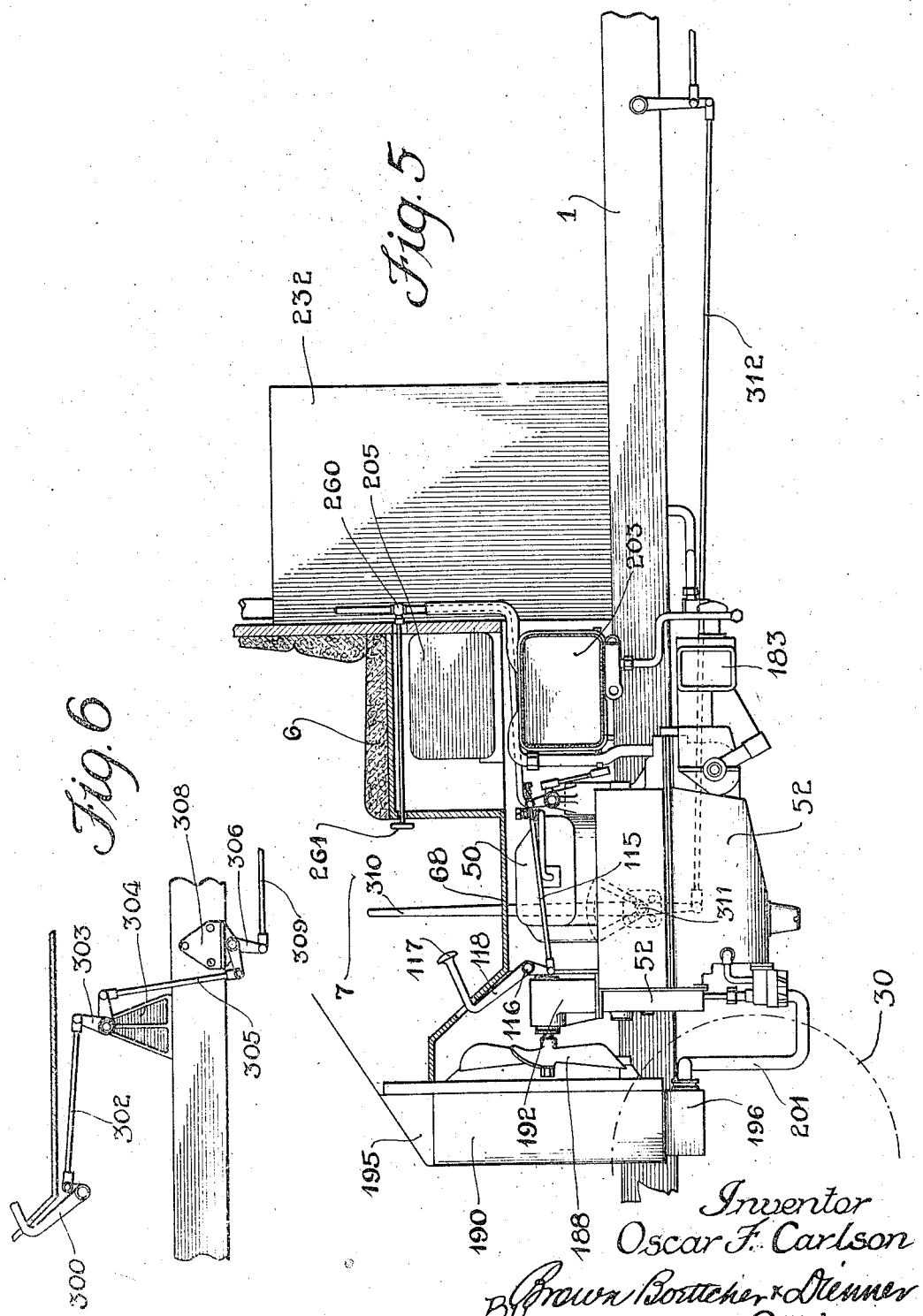

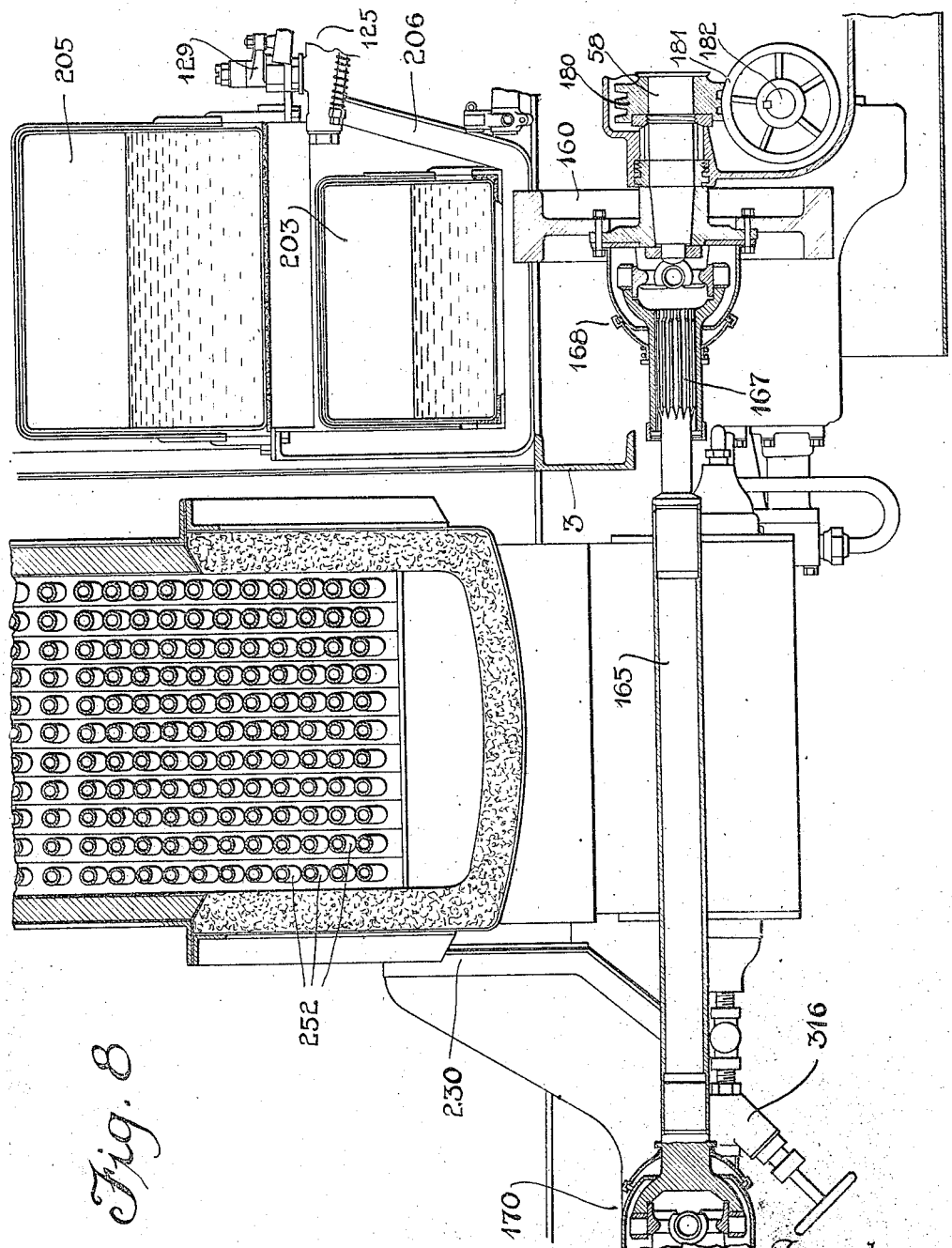

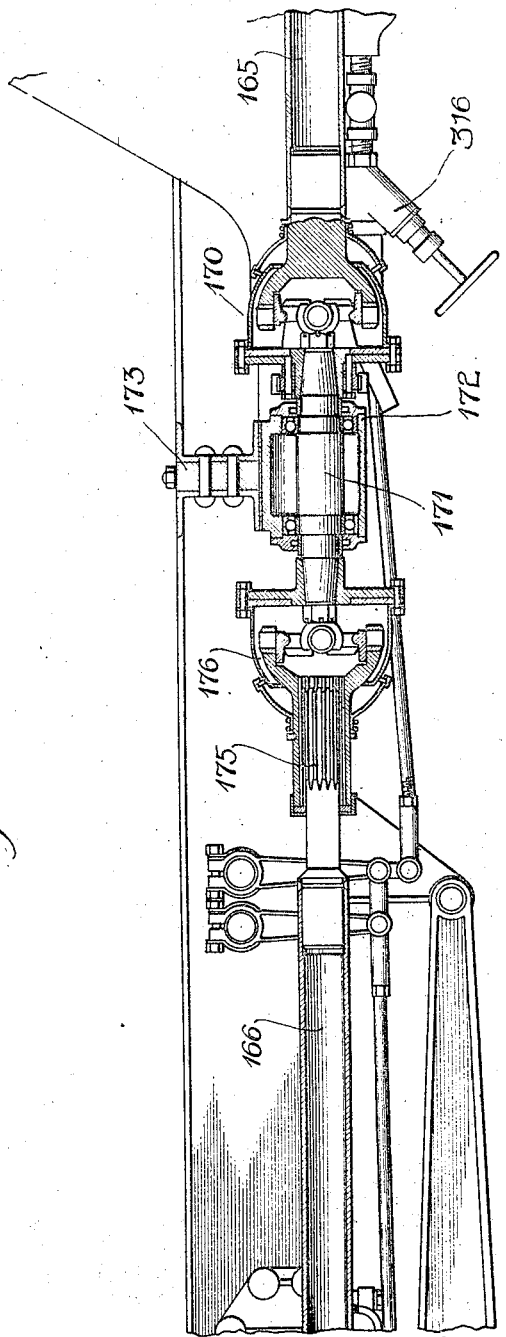

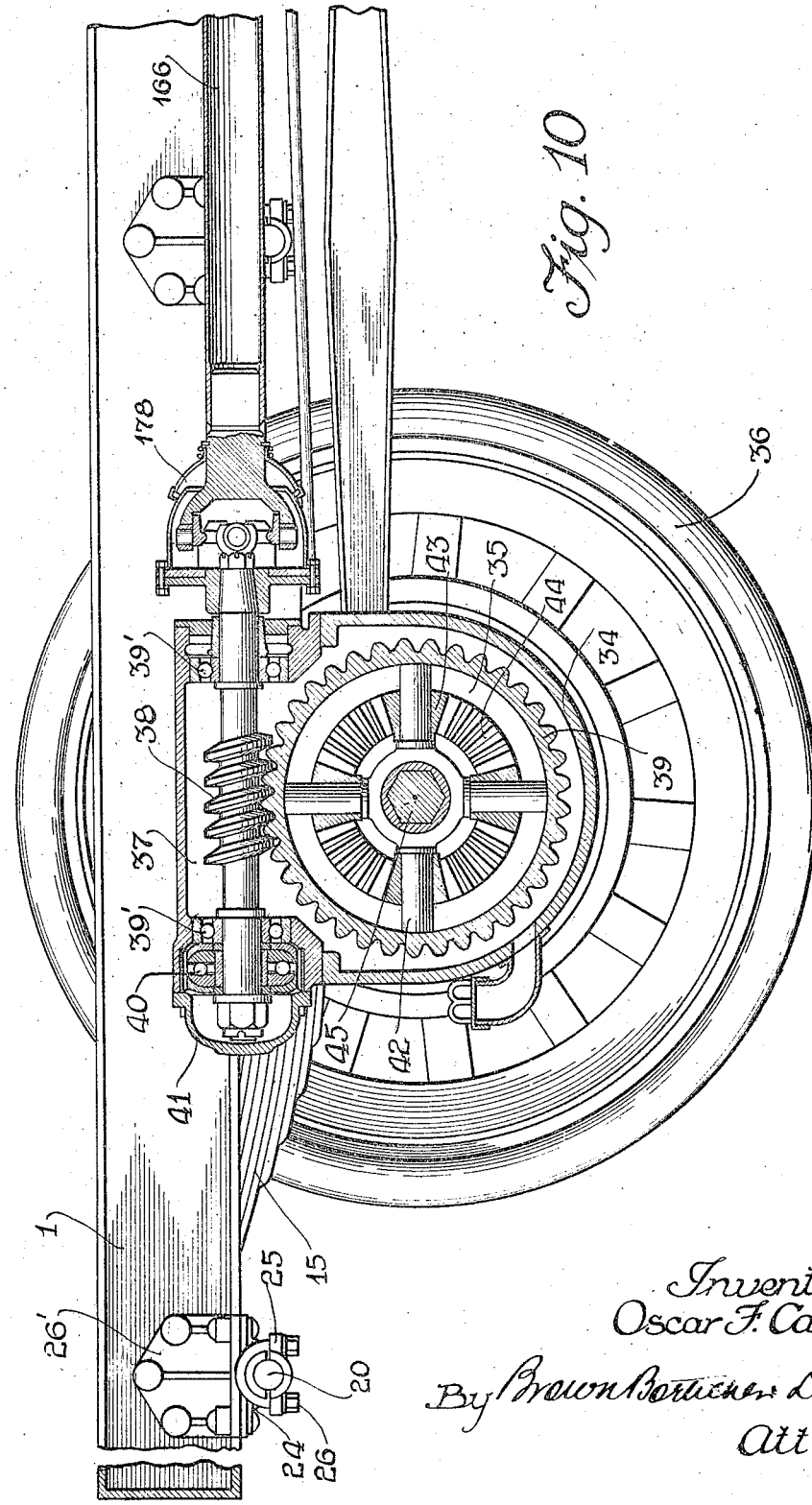

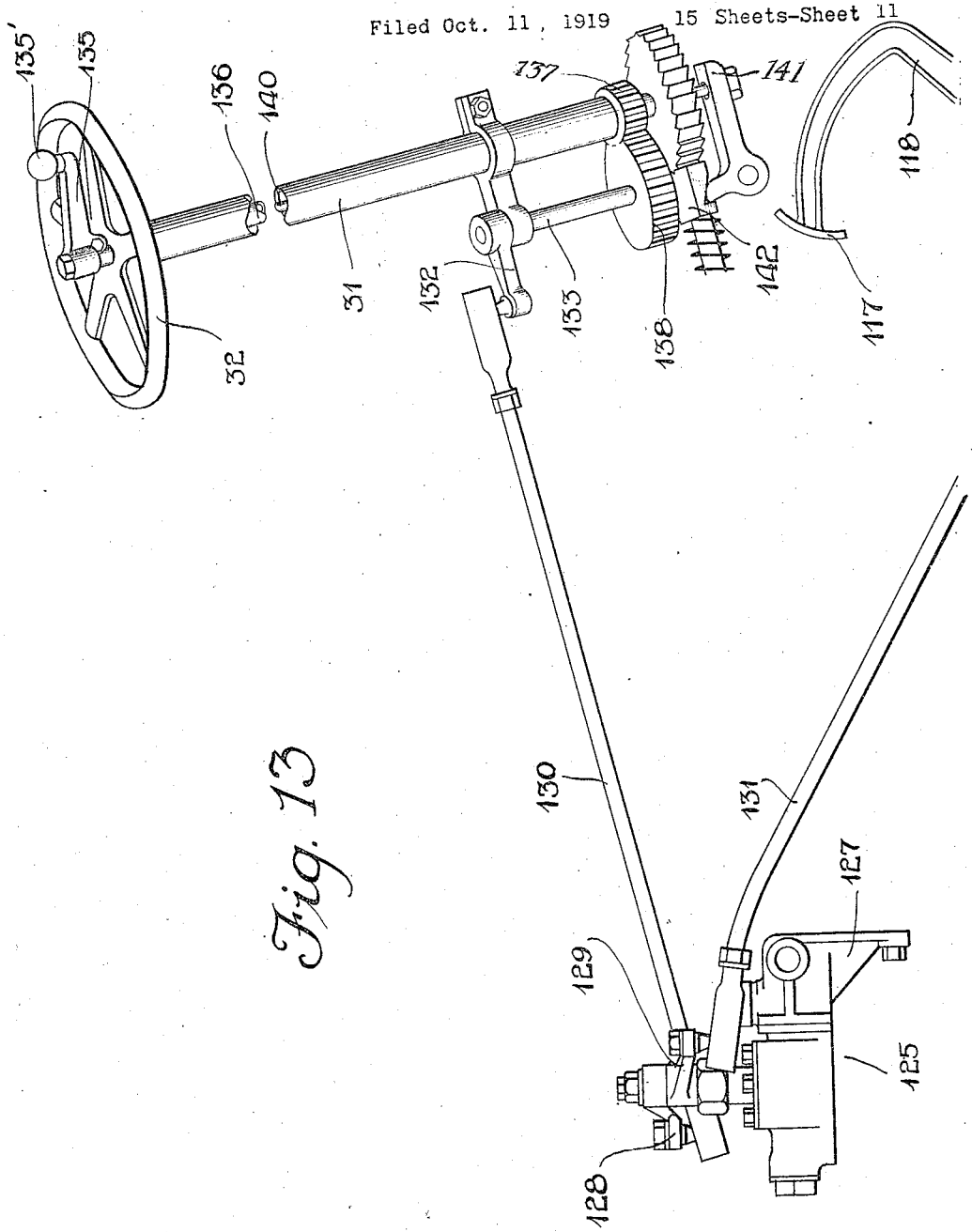

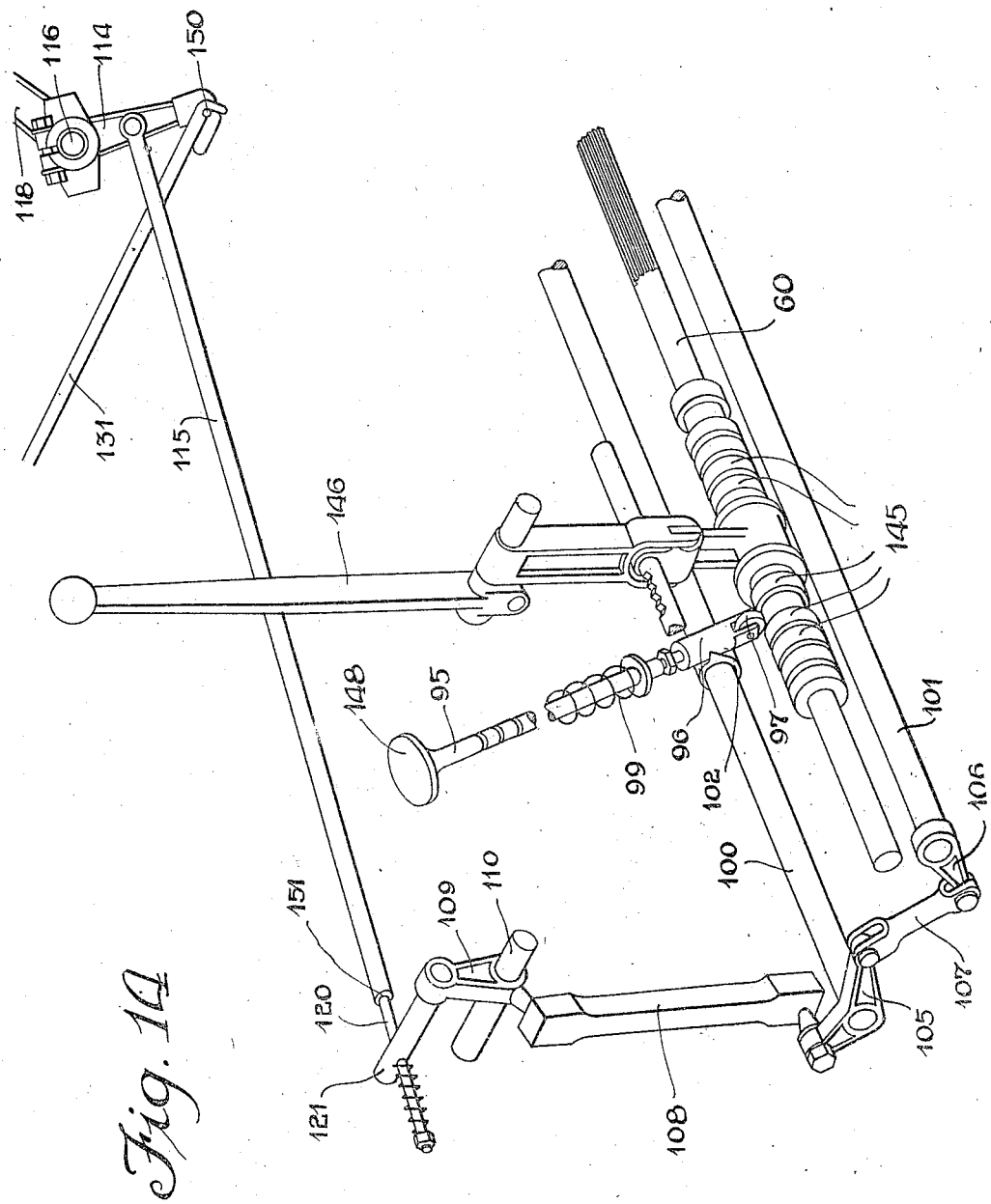

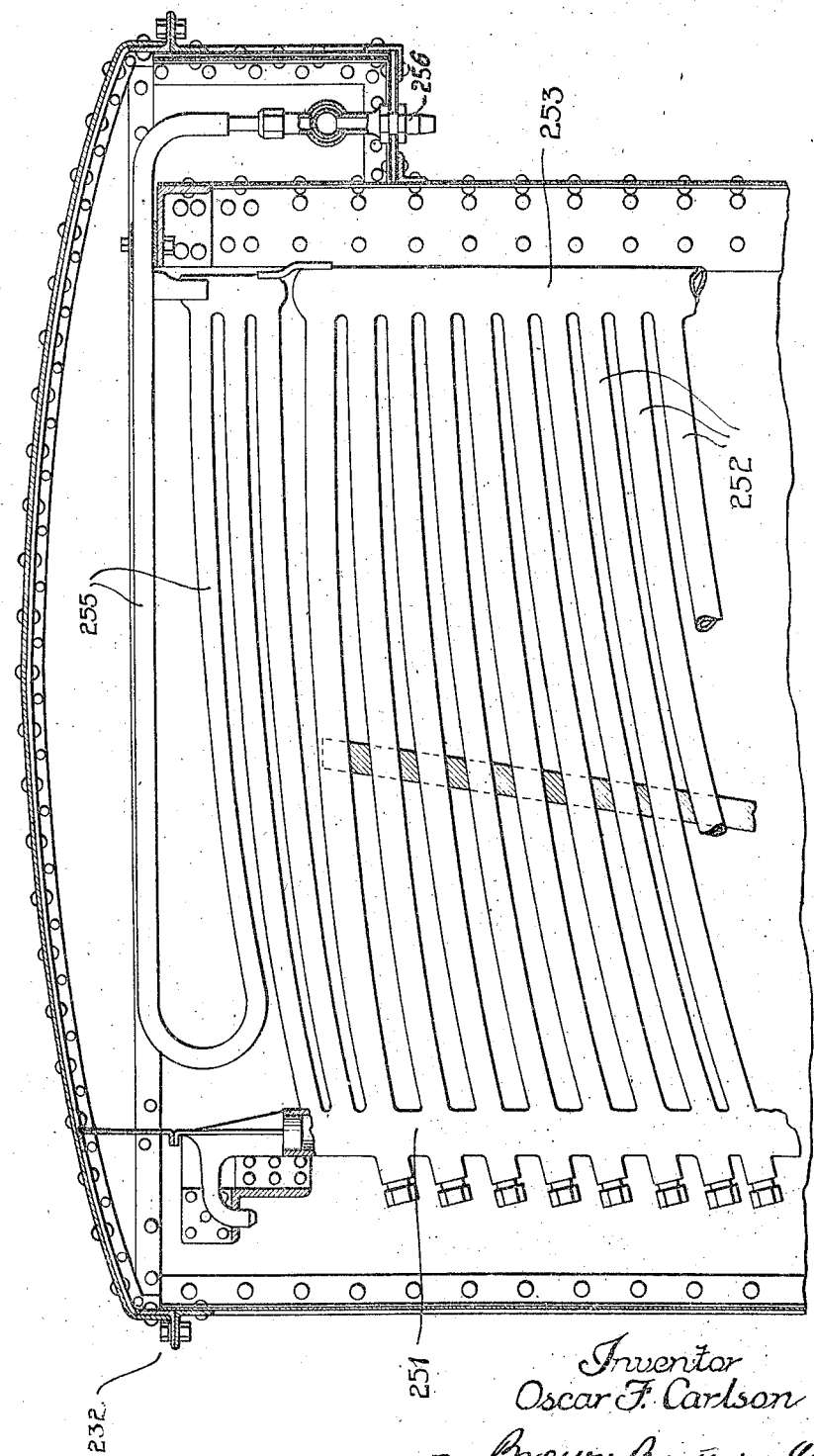

July 8, 1924.  
O. F. CARLSON  
MOTOR VEHICLE  
Filed Oct. 11, 1919 15 Sheets-Sheet 14

1,500,801

Inventor
Oscar F. Carlson
By Brown Boettcher & Diener
Att'ys

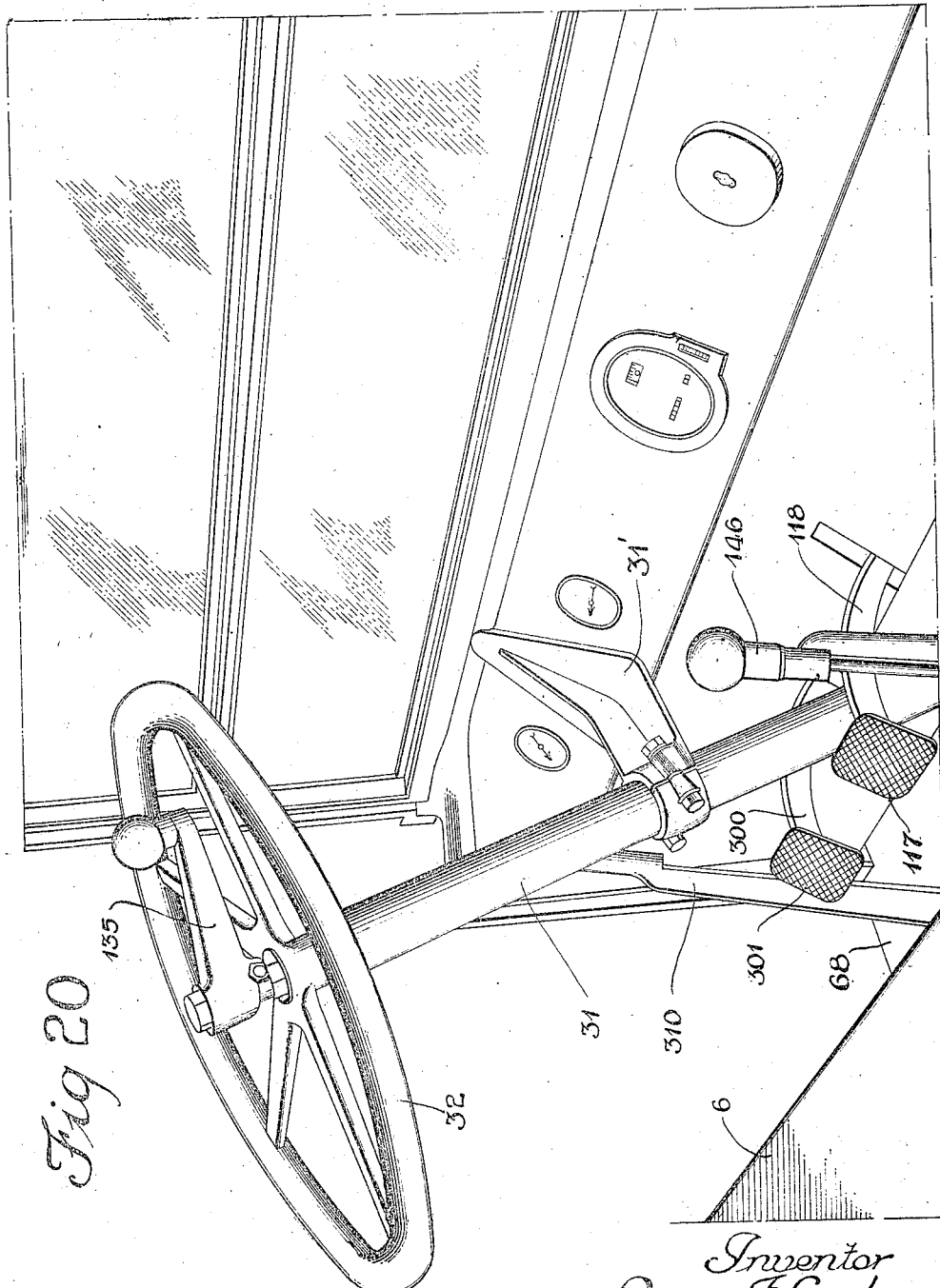

Patented July 8, 1924.

1,500,801

UNITED STATES PATENT OFFICE.

OSCAR F. CARLSON, OF CHICAGO, ILLINOIS, ASSIGNOR TO AMALGAMATED MACHINERY CORP., OF CHICAGO, ILLINOIS, A CORPORATION OF ILLINOIS.

MOTOR VEHICLE.

Application filed October 11, 1919. Serial No. 330,036.

*To all whom it may concern:*

Be it known that I, OSCAR F. CARLSON, a citizen of the United States, residing at Chicago, in the county of Cook and State of Illinois, have invented a certain new and useful Improvement in Motor Vehicles, of which the following is a full, clear, concise, and exact description, reference being had to the accompanying drawings, forming a part of this application.

My invention relates to motor vehicles and is particularly concerned with an automobile truck having many novel features particularly embodying the principle of the economical evolution of power thru the medium of steam under high pressure.

In the development of a steam automobile truck in addition to considering the details of construction of the various specific devices involved, the combination and arrangement of such devices with respect to each other and with respect to the vehicle as a whole, must be carefully considered. In fact this co-operative arrangement must be considered and the details of the various devices worked out accordingly if the vehicle is to attain a high order of efficiency over all reliability, simplicity and ease of operation.

Many of the specific devices or elements of the truck herein disclosed, as for example the burner, the boiler and boiler mounting, the throttle valve and throttle valve operating means and the valve gear and control mechanism for the engine are the subject matter of co-pending applications Serial Numbers 302,735, 258,745, 258,660 respectively, together with applications covering other minor details of the truck. In embodying these various devices in an automobile truck I have found it necessary to provide a number of novel structural improvements not disclosed in my co-pending applications. These novel structural improvements are therefore one of the features of the present application.

Furthermore, in embodying these various devices in a motor vehicle, a novel co-operative arrangement of the various devices with respect to each other and with respect to the vehicle as a whole, such as has not hereinbefore been provided, is attained. This novel co-operative arrangement of the various elements of the vehicle therefor forms a further feature of the present invention.

A still further feature of my invention is the provision of a simple and direct circulatory system in a vehicle of this class. An extensive piping or circulatory system adds to the complexity of the vehicle, decreases the efficiency and overall reliability of the vehicle and increases the cost of operation considerably. For example, in arranging the boiler forward of the driver's seat beneath the hood, the engine at the rear driving axle, where it and the various pipe connections are subject to every jar and strain incident to travel over rough roads and the condenser or radiator at the forward extremity of the vehicle as has been customary heretofore in the art, an extensive and inefficient piping system must be employed.

Numerous other advantages of my invention and novel structural details will appear from the following detailed description and the claims, taken with an inspection of the accompanying drawings, wherein I have illustrated my improved automobile truck in its entirety, to the end that there will be no question of such disclosure as to enable persons skilled in the art to make and use the invention.

Figure 1 is a side elevation of a truck embodying my invention;

Figure 2 is a front elevational view of the same;

Figure 3 is a plan view of the frame and running gear of the vehicle with the body removed;

Figure 4 is a comprehensive diagram illustrating diagrammatically the entire circulatory system of the vehicle;

Figure 5 is a vertical section more or less diagrammatic, of the front assembly of the vehicle taken substantially on the line 5—5 of Figure 3, showing the engine and various operating connections in elevation;

Figure 6 is a fragmentary elevational view showing the means thru which the brake mechanism of the vehicle is actuated;

Figure 8 is a vertical, longitudinal cross section of the boiler and the forward portion of the power transmission shaft of the vehicle;

Figure 9 is a vertical, longitudinal cross section of the intermediate portion of the power transmission shaft showing the center support bearing therefor;

Figure 10 is a vertical longitudinal cross section of the rear portion of the power transmission shaft and rear axle showing the drive gearing therebetween. Figure 8 is to be placed to the left of Figure 7, Figure 9 to the left of Figure 8, and Figure 10 to the left of Figure 9 in order to form a complete vertical longitudinal cross section taken substantially on the line A—A of Figure 3;

Figure 11 is a vertical transverse cross section of the engine;

Figure 12 is a front elevational view of the same;

Figures 13 and 14 are parts of a comprehensive diagram illustrating diagrammatically the operating connections for the throttle valve and the controls for the cut-off valve mechanism. Figure 14 is to be arranged below Figure 13 in order to form a complete diagram;

Figures 15 and 16 are parts of an enlarged longitudinal vertical cross section of the boiler and burner. Figure 16 is to be arranged below Figure 15;

Figure 17 is a transverse cross section of one of the longitudinal channels of the vehicle frame, showing the spring shackle for connecting the carrying springs of the vehicle to the frame;

Figure 18 is an inner side elevational view of the spring shackle;

Figure 19 is an isometric view of one of the front gusset plates of the main vehicle frame; and Figure 20 is a perspective view showing the arrangement of the controls relative to the driver's seat.

Figure 7:
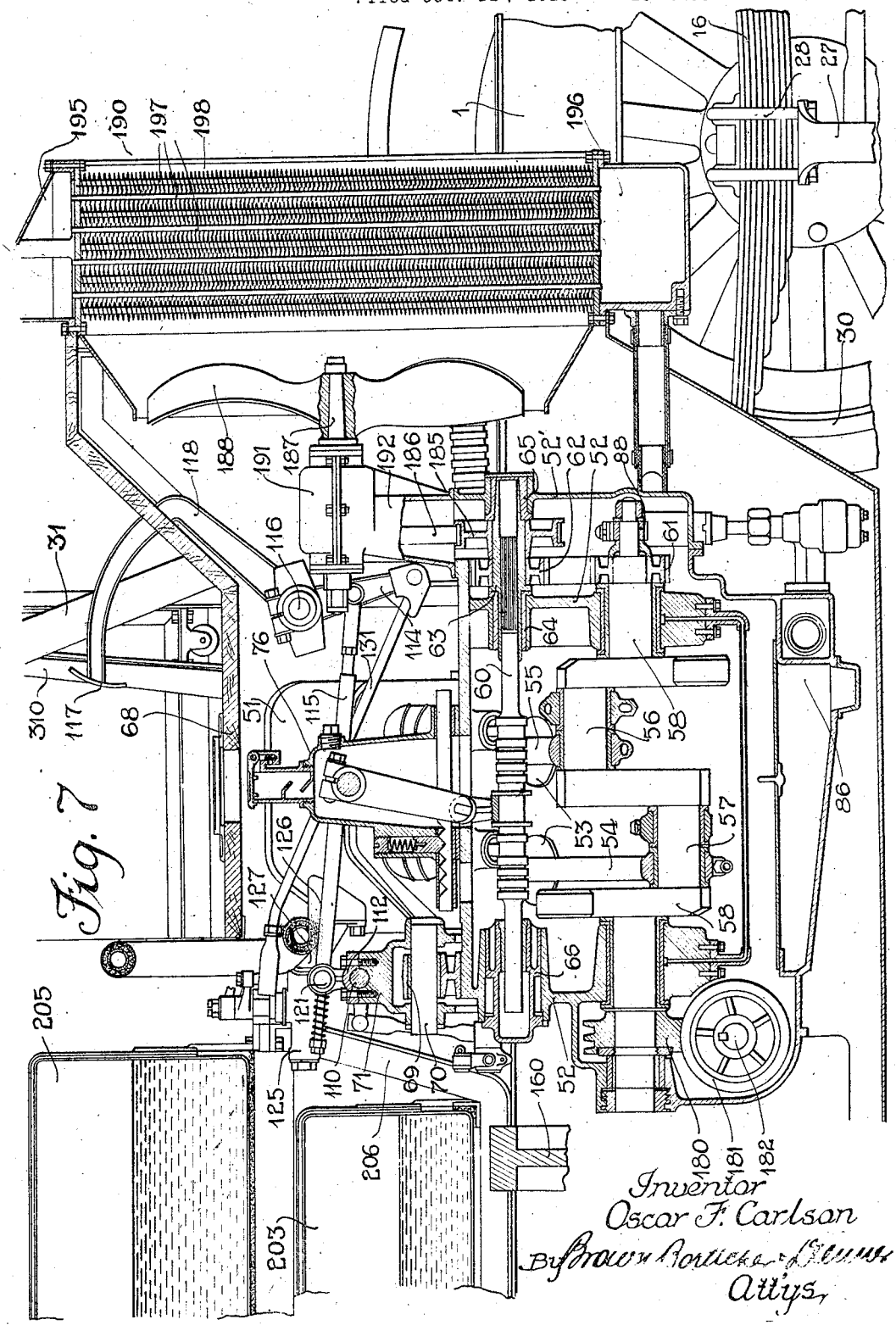
Figure 7 is a vertical, longitudinal cross section of the engine and vehicle construction.

Referring to the drawings, it will be seen that the main frame or chassis of my improved truck is composed of a pair of longitudinal sill members 1 and 2 having a plurality of cross girths 3 arranged therebetween. The opposite ends of the cross girths 3 are connected to the longitudinal sill members 1 and 2 thru the gusset plates 4. The gusset plates connecting the forward ends of the longitudinal sill members 1 and 2 and the forward cross girth 3 are provided with integral forwardly extending spring suspension arms 5, as shown in Figure 19, thru which the forward ends of the front springs 16 of the vehicle are pivotally suspended from the main frame, as will be hereinafter more fully described.

The driver's seat 6, (Figure 5) is enclosed by a cab 7 (Figure 1) to which cab 7 admission is gained by way of the usual running boards 8. The fenders or mud guards 9 are attached to the main frame of the vehicle by means of bracket members 10, having a transverse tie rod 11 arranged therebetween to more firmly brace the forward ends of the fenders 9.

The chassis or main frame of the vehicle carries a plurality of transverse bolsters 12 upon which transverse bolsters 12 is mounted a horizontal platform 13. This horizontal platform 13 is typical of the various types of platforms provided in connection with the various stake and panel bodies now in use. The stake body shown is merely illustrative, as the particular type of body employed is immaterial in so far as the essence of the invention is concerned. In fact my invention is equally applicable in connection with most any type of commercial vehicle.

The electrical apparatus of the vehicle and a small air pump 214 for the burner are housed in a compartment disposed adjacent the rear end of the running board 8 (Figure 1) to which compartment access is had by way of a suitable door 14.

The frame of the vehicle is supported upon the usual rear and front springs 15 and 16. The rear ends of the front springs 16 are shackled while the forward ends of these springs are suspended from the pivot pins 17 which pivot pins are mounted in the forward ends of the spring suspension arms 5 extending from the front gusset plates as hereinbefore pointed out. The forward and rear ends of the rear springs 15 of the vehicle are shackled to the main frame as shown in Figure 1.

The spring shackles employed in connection with the opposite ends of the rear springs 15 and the rear ends of the front springs 16 comprise, as clearly shown in Figures 17 and 18, a boss 18 bored out to receive a shaft 20 upon which shaft 20 the shackle is sleeved and free to rotate. The upper portion of the shackle is bifurcated to provide a pair of upwardly extending arms 21. These upwardly extending arms 21 are provided with aligned bores in which the opposite ends of a pin or shaft 22 bears. The end of the spring proper, or the leaves thereof, are sleeved upon or otherwise pivotally suspended from the pin 22, which pin or shaft 22 is lubricated by means of oil cups 23, or in any other suitable manner.

The inner portion of the shackle shaft 20 is mounted between a shackle shaft bracket 24, and a bracket cap 25, which bracket cap 25 is securely clamped by means of suitable yoke bolts or bracket clips 26 to the shackle bracket 24. The bracket 24 is in turn bolted, riveted, or otherwise suitably secured to a supporting bracket 26', the upwardly extending flange of which supporting bracket it fitted to the inner side of the particular longitudinal sill member in point and securely bolted or riveted thereto as shown.

The front springs 16 of the vehicle rest or are seated intermediate their length upon the front axle 27, being securely clamped in place by means of suitable yoke bolts 28, or the like, as shown in Figure 7.

The front anxle 27 is of the stub axle type, that is, the opposite ends of this axle are yoked for the reception of the usual steering knuckles 29. The steering knuckles 29 are provided with the usual horizontally projecting arms upon which the front wheels 30 of the vehicle are mounted. The steering post 31 extends from the floor of the vehicle and is provided with the usual steering wheel 32 arranged for convenient manipulation from the driver's seat 6. The steering post 31 is braced intermediate its length by means of a bracket member 31', as clearly shown in Figure 20. Rotation of the steering wheel 32 steers the vehicle by swinging the wheels 30 thru the usual steering knuckle actuating connections (not shown). The center of the front axle 27 is preferably bent down as shown in Figure 2 so that it is the lowest point of the vehicle except the wheels; this is done in order to protect the mechanism such as the fly wheel from being struck by high spots in the road.

The rear springs 15 of the vehicle rest or are seated intermediate their length upon the hollow axle casing 34 of the rear drive axle of the vehicle (Figure 3); the hollow axle casing 34 encloses a differential or compensating gearing 35 (Figure 10) and the usual drive axle sections thru which the rear wheels 36 of the vehicle are driven. The upper side of the hollow axle casing 34 is provided with an opening intermediate the ends thereof. This opening is closed by a housing 37, which housing or casing encloses a worm 38.

The worm 38 meshes at all times with the ring or worm gear 39 of the differential. The opposite ends of the worm shaft are journaled in radial bearings 39' mounted in the opposite ends of the worm housing 37. A thrust bearing 40 is provided adjacent the rear end of the worm shaft, which free rear end is enclosed by a cap plate 41 removably attached to the worm housing 37. The ring gear 39 carries the usual spider 42 carrying the bevel pinions 43, which bevel pinions constantly intermesh with the usual opposed bevel gears 44 provided on the adjacent ends of the drive axle section 45, as well understood by those skilled in the art. Power is transmitted from the drive or propeller shaft of the vehicle thru a universal joint to the worm 38 and then thru the differential 35 and drive axle sections 45 to the rear wheels 36.

The steam engine 50 (Figures 3, 4, 5, 11 and 12) is of the uniflow, single acting, single expansion multi-cylinder V-type. The four cylinders 51 are mounted upon the crank case 52, opening into the same as indicated at 53 to permit the connecting rods 54 and 55 to pass therethru to the wrist pins 56 and 57 of the crank shaft 58. The connecting rods are mounted in pairs upon the wrist pins 56 and 57.

The cam shaft 60 is driven in synchronous relation with the crank shaft 58 by means of the gears 61 and 62, which may be connected by an idling gear or by a suitable driving chain or the like. The gear 62 is fastened upon a sleeve 63, which has bearings in the boxes 64 and 65 secured to the main portion of the crank case and mounted in the supplemental portion of the crank case respectively. The sleeve 63 is internally splined to receive the correspondingly splined end of the cam shaft 60. The opposite end of the cam shaft 60 is mounted in a suitable bearing secured in a housing 66 connected to the crank case of the engine.

The engine 50 is mounted on the frame of the vehicle beneath the floor boards 68 of the cab 7, preferably thru a three-point suspension. The upper rear part of the crank case of the engine has a lug or enlargement 69 (Figure 7) which is bored out to receive a pin 70 that is securely mounted in a transverse frame member 71, thereby forming one of the points of suspension of the engine 50. The upper forward part of the crank case 52 is provided with transversely projecting box-like portions 73 as clearly shown in Figures 3, 4 and 12. These box-like portions 73 extend transversely between the longitudinal sill members 1 and 2 of the frame of the vehicle and co-operate with suitable brackets 75 carried by the longitudinal sill members. The box-like portions 73 are securely bolted against displacement. Thus the suspension points of the engine 50 are located at the opposite forward edges of the crank case 52 and intermediate the rear edge of the crank case, making three points in all.

As clearly shown in Figures 11 and 12, the crank case 52 has its upper walls upon which the engine cylinders 51 are mounted, arranged at an angle of substantially 45° to the horizontal, the two side walls being thereby substantially at right angles to each other. However, the walls do not join at a sharp angle, but join by a flattened portion upon which is seated a housing 76.

The cylinders of the engine are provided with intake ports 77 and exhaust ports 78 (Figure 11). The exhaust ports 78 communicate by way of an annular exhaust pocket 79 with the exhaust manifold 80 of the engine, which exhaust manifold 80 leads to the condenser, as will be hereinafter more fully described. The pistons 81 are of the long trunk type.

A circulatory pump 85 is employed for pumping the oil from the oil reservoir 86 provided in the lower part of the crank case up to the main shaft, cam shaft, wrist pin bearings and other parts of the engine to be lubricated. This oil drains back thru a suitable filter 87 (Figure 11) to the oil reservoir 86 provided in the bottom of the crank case 52 and is again pumped into the upper part of the engine, setting up a continuous circulation of oil. The pump 85 is mounted adjacent the forward end of the engine 50 and is driven from the crank shaft 58 of the engine thru a helical gear 88 mounted upon the front reduced diameter of the crank shaft. As clearly shown in Figure 4, the oil is not pumped directly from the reservoir 86 to the upper part of the engine, but a separator 91 is interposed in the pipe line between the reservoir 90 and the circulating pump 85. This separator 91 effectively drains off any condensation that might find its way to the crank case of the engine and thence to the oil reservoir 86. The water of condensation may be drained from the separator 91 by way of a drain cock 92 and in this manner the lubricating system of the engine is at all times rendered free from water.

Referring to Figures 7 and 11, the cam shaft 60 lies directly below the housing 76, being centrally disposed between the cylinders of the engine as clearly set out in my co-pending application Serial Number 258,660, filed October 17, 1918. The intake ports 77 of the engine are controlled by admission valves having stems 95 extending down toward the cam shaft 60. Between the end of the valve stems 95 and the cam there is interposed a push rod 96 and roller 97 disclosed in detail in the above application. The valve is held upon its seat by means of the spring 99. A housing 98 covers the spring 99, valve stem and push rod, completely enclosing these parts.

In order to lift the tappet guides against the tension of the spring 99, the tappet lifting shafts 100 and 101 are provided with collars 102 keyed to the shaft and having lifting levers projecting therefrom as shown in Figure 11. These lifting levers normally project into suitable recesses 103, provided in the valve tappets, whereby a suitable rotation of the tappet lifting shafts 100 and 101 will raise or lift the valve tappets, thereby lifting the rollers 97 off of the cam shaft 60.

Referring to Figures 13 and 14, a bell crank lever 105 is connected to the tappet lifting shaft 100 and a lever arm 106 is connected to the lifting shaft 101 and these two shafts are operated in unison to lift the valve tappets from the cam shaft 60 for all of the cylinders of the engine. The bell crank 105 and arm 106 are connected by means of a link 107, the arms 105 and 106 being so placed that the tappet lifting shafts 100 and 101 will be rotated in opposite directions. The outer arm of the bell crank lever 105 is connected by means of a link 108 with a bell crank lever 109 preferably thru suitable ball and socket joints. The shaft 110, which forms the pivot of the bell crank lever 109, is mounted in the top of the frame member 71 by means of a clamp 112 as shown in Figure 7.

The pedal operated lever 114 is connected by a link 115 to the bell crank lever 109. The lever 114 is pivoted on a transverse shaft 116 and is operated by the pedal 117 and pedal lever 118. The pedal lever 118 projects thru the floor boards 68 of the cab 7 of the vehicle, positioning the foot pedal 117 for convenient access from the driver's seat 6, being in the position usually occupied by the clutch pedal in the gasoline propelled vehicle.

The link 115 between the pedal lever 118 and the bell crank lever 109 is provided with a reduced portion 120 which reduced portion 120 passes thru a pin 121 pivoted in the upper arm of the bell crank lever 109. This reduced portion is adapted to slide freely thru the pin 121 during the time that the pedal operated lever 118 is moved to close the throttle valve which I have provided for closing prior to lifting the valve tappet so that there will be no waste of steam.

The throttle valve 125, which is shown and described in greater detail in my co-pending application, Serial Number 258,748, filed October 18, 1918, is mounted by means of a bracket 127 upon a lug 126 formed upon the rear of the cylinder casting as shown in Figure 7. The arms 128 and 129 (Figure 13) of the throttle valve, which are adapted to have lost motion connection with each other are connected to the operating rods 130 and 131 respectively. The rod 130 is connected to a crank arm 132 which crank arm is in turn connected to the counter shaft 113. A manual operating lever 135 is pivoted centrally of the steering column 31 and lies within a steering wheel 32 in convenient position to be reached by the hand of the operator. The lever 135 is connected to a sleeve 136 carrying a gear 137, which gear 137 meshes with a gear 138 mounted on the countershaft 133. The lever 135 is provided with latch mechanism, including rod 140, bell crank 141 and sliding pawl 142 as clearly set out in my co-pending application, Serial Number 258,748, filed October 18, 1918, and immaterial here.

The cam shaft 60 of the engine, which has a series of cams 145 adapted to engage the rollers 97 for operating the valves 148, is moved axially by means of a manual lever 146 for varying the percentage of cut-off of the engine. This lever 146 passes thru a suitable slot in the floor boards 68 of the vehicle and is positioned adjacent the foot pedal 117 for convenient access from the driver's seat, being in the position usually occupied by the gear shift lever in gasoline propelled cars. When it is desired to move the cam shaft 68 it is necessary to raise the rollers 97 and valve tappets to allow for such movement and as the tappets in raising open the admission valves of the engine, it is necessary to shut off the throttle 125 to prevent wastage of steam. This is done as follows: Upon depressing the foot pedal 117 the lever 129 will be first moved to close the throttle. Thereupon the link 131 will be disengaged from the pin 150 carried by the lever 114 so that further movement of the arm 114 is ineffective to move the throttle arm 129. The shoulder 151 on the rod or link 115 then engages the pin 121 and causes lifting of the admission valves of the engine 50 by rotating the shafts 100 and 101 thru the connections hereinbefore pointed out.

The operation of this controlling mechanism is as follows: To shift the cam shaft 60 to change the cut-off or to cause reverse rotation of the engine as the case may be, the foot pedal 117 is depressed. This causes the arm 114 to move first to close the throttle valve 125 and then to lift the valve tappets and the admission valves out of the way of the cams 145 on the shaft 60. The shaft 60 may then be adjusted axially by means of the manual lever 146 to the desired position. To open the throttle 125 the latching mechanism is released by depressing the knob 135' and the lever 135 is then moved angularly to cause the pinion 137, the gear 138 and the crank arm 132 to move the required amount. This motion is transmitted thru the link 130 to the operating arm 128 and throttle valve 125. Opening of the throttle to the required amount is thus readily accomplished.

The crank shaft 58 is connected to a fly wheel 160 (Figures 3, 7 and 8) and thence thru the drive or propeller shaft to the rear wheels 36 of the vehicle. The drive or propeller shaft comprises a forward drive shaft section 165 and a rear drive shaft section 166. The front end of the forward shaft section 165 has splined connection as shown at 167 thru a universal joint 168 with the crank shaft 58 of the vehicle. The rear end of the forward shaft section 165 is connected thru a universal joint 170 with a short shaft 171 which short shaft 171 is mounted in a centre support bearing 172 secured to or upon some suitable support as the cross beam 173 of the vehicle. The center support bearing 172 is more fully disclosed and described in my co-pending application, Serial Number 261,329, filed November 6, 1918 and will not be described in detail here. The forward end of the rear drive shaft section 166 has splined connection as shown at 175 thru a universal joint 176 with the rear end of the short shaft 171. The opposite or rear end of the shaft section 166 is connected thru a universal joint 178 with the worm 38 from which worm 38 the drive or power is transmitted to the rear wheels 36 of the vehicle thru the drive mechanism hereinbefore referred to.

The crank shaft 58 carries a spiral gear 180 just forward of the fly wheel 160. The spiral gear 180 drives a co-operating gear 181 connected to a pair of pumps 183 thru a shaft 182, which pumps 183 supply feed water to the boiler and pump fuel to the burner as clearly shown in Figure 4.

The driven sleeve 63 splined upon the cam shaft 60, has a sprocket 185 driven in unison with the cam shaft. The sprocket 185 drives thru the medium of a chain belt 186 and a sprocket (not shown) the fan shaft 187. The fan 188, which fan is mounted on the shaft 187, is disposed adjacent the rear of the condenser 190 of the vehicle, which condenser 190 is in the position usually occupied by the radiator in the gasoline propelled vehicle, namely at the forward end of the vehicle as shown. The fan shaft 187 is journaled in a housing 191, which housing is mounted on a hollow pedestal 192, this pedestal being supported upon the main crank case 52 and the supplemental casing 52'.

The condenser 190 comprises, in this particular instance, an upper compartment 195 and a lower compartment 196, communicating therewith by way of a core structure comprising a plurality of vertical tubes 197 having heat dissipating fins 198 as clearly shown in Figure 7. The exhaust steam from the engine passes thru the pipe line 200 (Figure 4) to the upper compartment 195 of the condenser 190, where it is condensed, passing down thru the vertical tubes 197 to the lower compartment 196. This lower compartment 196 leads by way of a pipe line 201, to a condenser pump 202 mounted adjacent the forward end of the engine 50. The condenser pump 202 is driven from the crank shaft 58 of the engine thru the helical gear 88, mounted on the reduced diameter thereof (Figure 7), which helical gear 88 also drives the oil pump 85 as hereinbefore described. The circulating pump 202 pumps the water back to the water tank 203 by way of the pipe line 204.

The water and fuel tanks 203 and 205 respectively are mounted in suitable frame work 206 and are placed beneath the seat 6 of the vehicle as clearly shown in Figure 6. The water tank 203 communicates by way of a pipe line 208 with the water cylinder of the circulatory pumps 183 and thence by way of a pipe line 210 with the boiler of the vehicle to be hereinafter described.

The oil tank 205 communcates by way of a pipe line 212 with the oil cylinder of the circulatory pumps 183. The oil cylinder of the circulatory pumps 183 leads thru a pipe line 214, strainer 216 and automatic valve 215, to the burner 233. The automatic valve 215 is connected thru a pipe 217 with the steam line 218 of the vehicle. The fuel entering the burner 233 is thus regulated by the pressure in the boiler, the pressure in the boiler being generated according to the requirements of the engine 50. The pressure in the boiler in excess of that at which the automatic valve 215 will operate, will obviously cause operation of this valve, whereupon the oil from the pump 183 will be by-passed by way of the pipe line 220 back to the oil tank 205. When this pressure drops the valve will operate and the oil will be again fed by way of the line 214 to the burner 233.

In order that oil will be supplied to the burner 233 upon starting—that is before the engine 50 and consequently the circulatory pumps 183 have started—I provide a pressure accumulator 225 in the pipe line 214. This pressure accumulator 225 serves merely as an air cushion to provide a circulation of oil to the burner until the pump 183 is started, whereupon the pressure expended in supplying oil in starting is again filled up or replenished by the pump 183 for a subsequent starting operation. The pressure accumulator 225 is shown as comprising a plurality of interconnected chambers, although of course, this is immaterial. Should for any reason the pressure accumulated in the accumulator 225 be expended without starting the engine, this pressure can be readily replenished by means of a suitable hand pump 226 as shown, or in any other desired manner.

Figure 16:
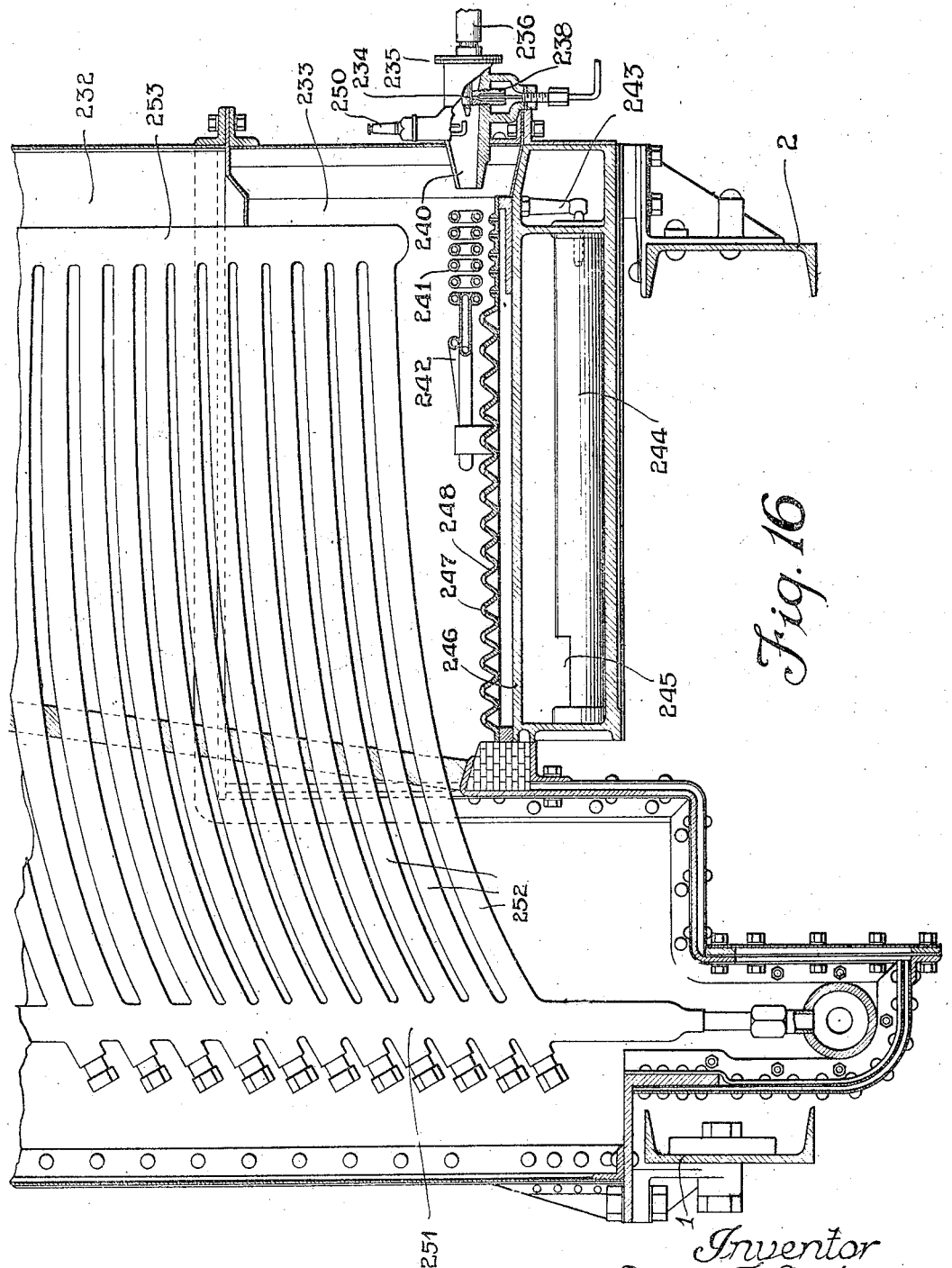

The boiler and burner, which boiler and burner form the subject matter of my co-pending application, Serial Number 302,735, filed June 9, 1919, are supported upon the longitudinal sill members 1 and 2 of the main frame of the vehicle by a special frame provided about the bottom of the boiler and burner casings respectively, which frame rests upon the main vehicle frame immediately adjacent the rear of the cab 7. Access to the boiler and burner and various connections thereof which are suitably enclosed, as shown in Figure 1, is had thru the hinged panel doors 231 provided therefor. The boiler casing 232 is preferably formed of sheet metal as is the burner casing 233. These casings are provided with suitable flanges to permit of convenient fastening of the casing sections together. Air is supplied the main nozzle 234 of the burner 235 from the pump 214 (shown in Figure 1) by way of the air line 236. Fuel oil is admitted to the main nozzle 234 by way of an oil nozzle 238, as clearly set out in the co-pending application above referred to. The nozzle 240 discharges into the interior of the flattened coil 241, thru which the oil is fed from the vapor generator loops 242. The flattened coil 241 leads thru the nozzle 243 to the mixing tube 244. The mixing tube 244 is cut away as shown at 245 (Figure 16) so that the mixture of vapor and hot air is discharged upwardly at the rear. The mixture passes around the edges of the baffle plate 246 and passes up thru the openings 247 in the burner casting or plate 248. The mixture discharged from the main atomizer nozzle 234 is ignited by means of a spark plug 250.

The water supplied the boiler by way of the line 210 enters the rear header 251, circulates thru the transverse tubes 252 and front header 253 to the horizontal superheating tubes 255. Steam is delivered from the uppermost superheating tube 255 by way of the steam delivery tube 256, the end of which is adapted for connection to the steam main 218 leading to the engine by way of the throttle valve 125 controlled as hereinbefore explained. A shut-off valve 260 is provided in the steam main 218 (Figure 4 and 5) and is controlled by means of a hand wheel 261 extending out beneath the driver's seat 6 and conveniently operable therefrom. The boiler is provided with a blow off valve 316 as clearly shown in Figures 1 and 8.

A gauge glass fitting 315 (Figure 2) indicates the level of the water in the steam boiler. This gauge glass fitting is preferably of such construction that the steam and water connections communicating therewith will be automatically sealed in case the gauge glass should be fractured so that loss of steam and danger of scalding the driver is prevented.

The vehicle is provided with the usual brake lever 300, extending from the floor boards 68 of the vehicle and positioning the foot pedal 301 for convenient access from the driver's seat. The lower arm of the lever 300 is connected thru a link 302 with a bell crank lever 303, which bell crank lever is pivotally supported by a bracket member 130

304 (Figure 6). The bell crank lever 303 is in turn connected thru a link 305 with a bell crank lever 306 pivotally suspended by means of a bracket member 308 from the frame of the vehicle. The bell crank lever 306 is connected thru a link 309 with the brake mechanism at the rear wheels of the vehicle.

A manual emergency brake lever 310 is positioned for convenient access from the driver's seat. This emergency brake lever 310 is pivoted intermediate its length as at 311 (Figure 5) and is connected at its lower end thru a link 312 with the brake mechanism at the rear wheels.

Obviously I have described my invention in connection with the details of a particular embodiment. I do not intend to limit the invention to such details as I am aware that modifications, changes and substitutions may be made within the scope of my invention and I have drawn the appended claims accordingly.

I claim:

1. In a circulatory system for steam driven vehicles, the combination with the engine boiler and burner of a tank for the fuel supply, a fuel supply line from said fuel tank to the burner, a steam line between the boiler and the engine, an automatic pressure controlled valve in said fuel supply line, and a steam connection for subjecting said valve to the pressure of the steam to regulate the fuel supply to the burner thereby.

2. In a circulatory system for steam driven vehicles, the combination with the engine, boiler and burner of a tank for the fuel supply, a fuel supply line from said fuel tank to the burner, a circulatory pump in said fuel supply line and a pressure accumulator in said fuel supply line for promoting circulation of fuel to the burner in starting, said pressure accumulator being normally in opened communication with said fuel supply tank.

3. In a circulatory system for steam driven vehicles, the combination with the engine, boiler and burner of a tank for the water supply, a water supply line between said tank and the boiler, a tank for the fuel supply, a fuel supply line from said tank to the burner, a combined fuel and water supply circulatory pump, and driving connections between the engine and said pump, said pump having water admission and discharge at one end and fuel admission and discharge at the opposite end.

4. In a steam driven vehicle, the combination with a vehicle frame of a condenser supported at the forward end of said frame, a driver's seat having fuel and water tanks positioned therebeneath, an engine suspended from the vehicle frame between the condenser and said fuel and water tanks, and a boiler supported upon said vehicle frame adjacent the rear of said driver's seat.

5. In a steam driven vehicle, the combination with the vehicle frame and engine of a driver's seat and a boiler mounted upon the vehicle frame, said boiler being disposed adjacent the rear of the driver's seat, and extending up behind the seat to a point thereabove.

6. In a steam driven vehicle, the combination with the vehicle frame of a driver's seat having fuel and water tanks positioned therebeneath, an engine suspended from the vehicle frame forward of said fuel and water tanks and a boiler mounted upon and disposed above said vehicle frame to the rear of said fuel and water tanks and extending up above the driver's seat.

7. In combination, an engine, a boiler, a burner, a source of water supply for the boiler, a source of fuel supply for the burner, a combined fuel and water circulatory pump having fuel admission and discharge at one end and water admission and discharge at the opposite end for supplying water to the boiler and fuel to the burner, said pump being arranged adjacent one end of the engine and having driving connection with the crank shaft thereof, and a pair of circulatory pumps arranged adjacent the opposite end of the engine and having driving connection with the crank shaft thereof for returning the working fluid to the source of supply and for supplying oil to the various bearings of the engine.

8. In combination, an engine, a boiler, a burner, a source of water supply for the boiler, a source of fuel supply for the burner, a combined fuel and water circulatory pump having fuel admission and discharge at one end and water admission and discharge at the opposite end for supplying water to the boiler and fuel to the burner, said pump being arranged adjacent one end of the engine and having driving connection with the crank shaft thereof, a pair of circulatory pumps arranged adjacent the opposite end of the engine and having driving connection with the crank shaft thereof for returning the working fluid to the source of supply and for supplying oil to the various bearings of the engine, a pressure accumulator normally in open communication with the source of fuel supply for promoting circulation of fuel to the burner in starting and means in the fuel line controlled by the pressure of the steam for regulating the fuel to the burner.

9. In a steam driven vehicle, the combination with the vehicle frame of a condenser supported at the forward end of said frame, a driver's seat supported by the vehicle frame, fuel and water supply tanks supported beneath said seat, a boiler mounted upon the vehicle frame to the rear of the driver's seat and extending up behind the seat, and an engine suspended from the vehicle frame between the condenser at the forward end of the frame and fuel and water supply tanks beneath the driver's seat.

10. In a steam driven vehicle, the combination with the vehicle frame of a condenser supported at the forward end of said frame, a driver's seat supported by the vehicle frame, fuel and water supply tanks supported beneath said seat, a boiler mounted upon the vehicle frame to the rear of the driver's seat and extending up behind the seat, an engine suspended from the vehicle frame between the condenser at the forward end of the frame and the fuel and water supply tanks beneath the driver's seat, and a direct line of circulation from the source of water supply to the boiler, from the boiler to the engine, from the engine to the condenser, and from the condenser back to the source of supply.

11. In a steam driven vehicle, the combination with a vehicle frame of a condenser supported at the forward end of said frame, a driver's seat supported by the vehicle frame, fuel and water supply tanks supported beneath said seat, a boiler mounted upon the vehicle frame to the rear of the driver's seat and extending up behind the seat, a burner beneath the boiler, an engine suspended from the vehicle frame between the condenser at the forward end of the frame, and the fuel and water supply tanks beneath the driver's seat, a direct line of circulation from the source of water supplied to the boiler, from the boiler to the engine, from the engine to the condenser, and from the condenser back to the source of supply, circulatory pumps in the line from the source of water supply to the boiler and the line from the condenser back to the source of supply, a fuel supply line from the source of fuel supply to the burner, pressure controlled means in said fuel supply line for regulating the fuel supply by the pressure of the steam and a pressure accumulator in the fuel supply line normally in open communication with the source of fuel supply.

In witness whereof, I hereunto subscribe my name this 8th day of October, A. D. 1919.

OSCAR F. CARLSON.